Dec. 5, 1939.    C. W. ACKERMAN    2,182,044
MECHANICAL WHEEL-BLOCKING DEVICE FOR VEHICLES
Filed July 3, 1937
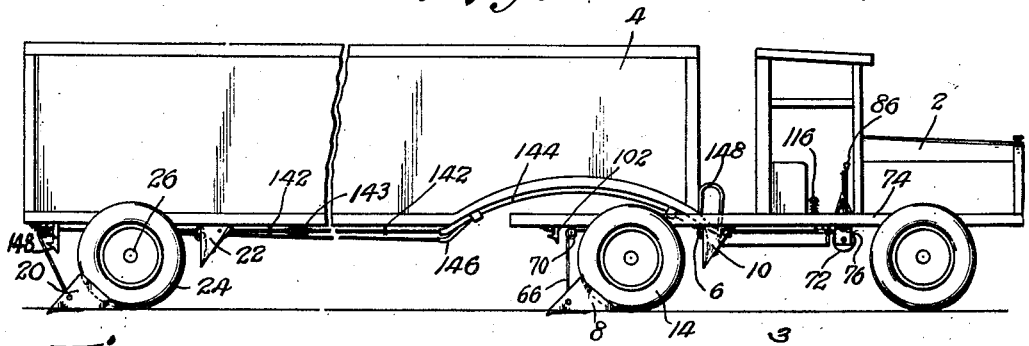
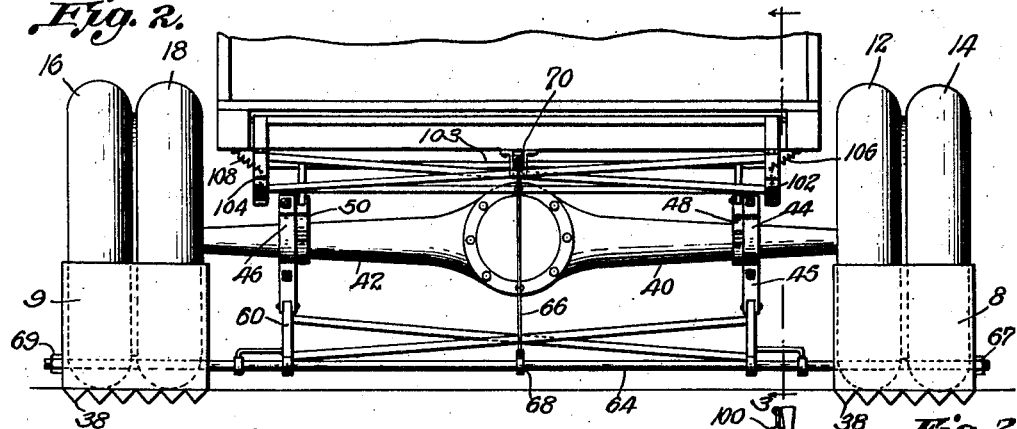
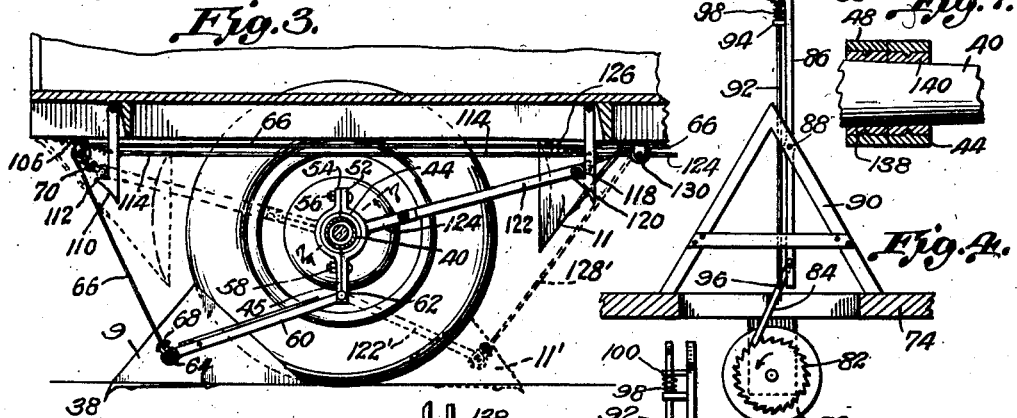
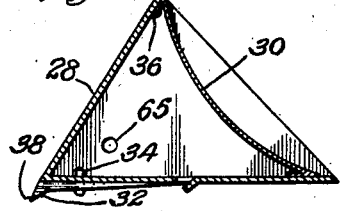
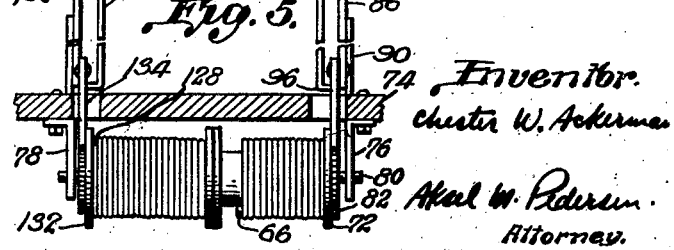

Patented Dec. 5, 1939

2,182,044

UNITED STATES PATENT OFFICE 2,182,044

MECHANICAL WHEEL-BLOCKING DEVICE FOR VEHICLES

Chester W. Ackerman, Broadview Heights, Ohio

Application July 3, 1937, Serial No. 151,904

7 Claims. (Cl. 188—4)

The present invention relates to a mechanical wheel-blocking device for vehicles and more particularly to a mechanically operated safety blocking device or stop mechanism, for use in connection with vehicles to arrest undesired movement and particularly to prevent back-slipping on slippery up-grades and other purposes, as hereinafter described in detail.

It is well known that in the operation of trucks and other large motor vehicles, it is customary for the operators or drivers to carry with them blocks of wood, which are square in cross-section, for use in passing over steep grades where there is danger of slipping or sliding in the event that the motor stalls, or where it is necessary to stop on a steep grade, as when the engine overheats, to prevent the vehicle from starting or moving backward.

Insurance companies and the laws of some states require the operators of trucks to use blocks of wood as above referred to as a safety device to prevent accidents due to slipping or sliding of trucks on steep grades or slippery pavements on ordinary grades.

The use of such devices, and the laws regulating and compelling their use, indicates the serious danger of accidents in the operation of such large motor vehicles and other vehicles. It is well known, for example, that in starting motor vehicles in general on a grade, most operators first speed-up the motor by means of the hand throttle, then they take the foot off the footbrake and put the foot on the accelerator; and before the clutch is let in the vehicle starts to go backward. If the road is at all slippery the vehicle slides and generally the motor is "killed" before the vehicle begins to move forward. The same procedure is again gone through with more wear on the tires, and strain on the motor, the clutch and the operator's disposition until the vehicle is successfully launched forward, if the road conditions permit.

If there is ice on the pavement, or if the grade is excessively steep, it frequently happens that the vehicle gets out of control and many wrecks and accidents occur resulting in property damage and injury to persons because of the mere inability to properly start a vehicle on a hill or grade.

Even in the use of wooden blocks in connection with the operation of trucks or busses, it frequently happens that the person throwing or placing the blocks under the back of the tires does not succeed in placing them properly and much difficulty is experienced in properly placing the wooden obstruction or stop back of both wheels at the same time, so that there is the constant tendency to promote side-slipping of the vehicle and there is always more or less danger to the person placing the blocks back of the wheels of a moving vehicle.

If the vehicle is backing up an incline, the blocks have to be placed in front of the rear wheels and the placing of blocks in front of both wheels becomes particularly difficult because of the necessity of running around the truck, generally in back of it, where the person cannot be seen by the driver and the danger of accident is greatly increased.

Moreover, in general, the blocks cannot be placed rapidly enough against the face of both rear wheels to prevent sliding on a slippery pavement and, in fact, it frequently happens that the placing of a block under one wheel results in swinging the truck around so as to head in the wrong direction before the other block can be properly placed under the other corresponding wheel.

The difficulties in connection with the operation of trailers and tractors, due to the fact that they are frequently used off the beaten path and in more or less inaccessible places is too apparent to require explanation or further comment.

It may be stated, however, that in connection with the use of mechanical wheel blocking devices for both the trailer and tractor, or drawing vehicle, it is of particular importance that the blocking or gripping devices be applied first to the more elevated of the vehicles so as to maintain tension in the coupling device, as otherwise there is a tendency for doubling or jack-knife action, by which accidents might easily result.

For example, if a tractor is pulling a trailer up a hill or grade, and the motor is stopped, the wheel-blocking mechanism should be operated first on the tractor so as to maintain tension in the coupler. If the wheel-blocking device on the rear wheels of the trailer were operated first and the tractor should slide back, there would be a doubling movement by which the vehicles would pass out of alignment. On the other hand, if the trailer is being backed up an incline, the wheel-blocking devices at the front of the rear wheels of the trailer should be applied first in order to avoid danger of accident.

Among the objects of the invention are to provide a mechanically operated wheel-blocking device which may be rapidly operated from the driver's seat or other suitable location without interfering with the traction or movement of the wheels of the vehicle and without the necessity of the operator leaving the driver's seat.

Another object of the invention is to provide mechanically operated means mounted in operative position in connection with the rear wheels or corresponding wheel pairs of a vehicle to obtain road gripping action to prevent undesired slipping or sliding movement of the vehicle on a grade, either in a forward, rearward or lateral direction and which may be operated substantially simultaneously in connection with any set or pair of wheels to prevent sideways movement or change of direction of the vehicle.

Another object of the invention is to provide mechanically operated gripping means or wheel-blocking means both in front of and to the rear of the rear wheels of a vehicle so that the wheels may be blocked in either direction of movement as desired.

Another object of the invention is to provide a vehicle wheel-blocking device which is suspended in position for operation in such a manner as to maintain a constant distance from the road surface irrespective of changes in load conditions of the vehicle.

Another object of the invention is to provide a mechanically operated wheel-blocking means so mounted in relation to the wheels of a vehicle and so designed that it may be employed as a creeping device.

For example, in the operation of a truck in passing up a steep incline, it frequently happens that the engine becomes overheated and it is necessary to stop at intervals to allow the motor to cool down. In the usual operation of starting on a hill, as above explained, the vehicle ordinarily begins a movement down hill, unless the brakes are kept applied during the starting movement which puts an added load on the engine.

By means of the wheel-blocking device, hereinafter fully described, it is necessary only to operate the wheel-blocking means at the rear of the rear wheels, which remain in gripping contact with the road surface until the truck moves forwardly, and serve to prevent a backward movement of the truck when the engine is started.

In starting the truck up the hill by the use of the wheel-blocking means as described, it becomes unnecessary to race the engine and the clutch may be gradually let in to take the load without the necessity of providing for the extra load or force due to an initial movement of the truck down-hill. The device serves, therefore, as a creeping device, preventing backward movement while the gripping device remains in contact with the pavement or road surface.

Without referring to details of construction, it will be understood that gripping means are provided so that in the event of a sliding movement of a vehicle the said means will engage or partly imbed into the surface of the road so as to prevent undesired movement.

Said gripping means are preferably mounted on the axles of the rear wheels, both in front of and to the rear of the wheels adjacent the face thereof so as to maintain a substantially constant distance from the road surface in a raised position, the said distance being such that the gripping device may be rapidly lowered to engaging position with the road surface.

When mounted in connection with a truck having twin-dual wheels, for example, one set of the safety blocks will be mounted to the rear of the rear pair of wheels, and another set may be mounted forwardly of the forward pair of wheels, the operating means for the sets being independent, so that either set of gripping means may be lowered at a moment's notice when desired.

If the truck is ascending an up-grade for example, and an icy surface is encountered causing slipping of the vehicle wheels, which would normally result in the movement of the truck downhill, the rear set of safety blocks may be lowered, causing the teeth or gripping means thereon to engage the surface of the road, thus immediately preventing further slipping of the truck.

It will be obvious also that in backing movements of a truck, trailer or other vehicle, the forward set of safety blocks serve to prevent undesired slipping movements, as when the vehicle is backing up on an up-grade, for example. It will be apparent also that by the use of the safety blocks as described, the use of foot brakes and hand brakes in the starting, backing and other maneuvering movements is rendered unnecessary, such brakes being employed only in connection with the normal driving.

With the above and other objects in view, the invention comprises the various features hereinafter fully described and illustrated in the drawing.

The accompanying drawing illustrates the preferred embodiment of the invention, in which:

Fig. 1 is a view in elevation showing the invention as applied to a tractor-trailer combination;

Fig. 2 is an end view of the tractor of the combination shown in Fig. 1, in which the rear wheel-blocking device is illustrated in its down or operating position;

Fig. 3 is a fragmentary view, partly in section, taken on the section line 3—3 of Fig. 2;

Fig. 4 is a fragmentary enlarged sectional view of the lever operating mechanism including a pawl and ratchet device by which the winches, carrying cables attached to the various wheel-blocking units, are operated;

Fig. 5 is a view of the winch mechanism, as viewed from the left in Fig. 4;

Fig. 6 is an enlarged sectional view of the safety block or wheel-blocking device showing the preferred mode of construction thereof; and Fig. 7 is a detailed sectional view of the axle of the rear wheel as shown in Fig. 3, indicating the manner in which the supports for the wheel-blocking devices are mounted on the shaft casing, the view being taken on section line 7—7 of Fig. 3.

Referring more in detail to the drawing, the numeral 2 indicates a tractor of the usual form which is connected to a trailer 4, having a coupling device 6 by means of which the trailer is drawn.

Operatively connected with the rear wheels of the tractor are mechanically operated safety blocks 8, 9 and 10, 11, the safety blocks 8 and 9 being independently mounted to the rear of the rear wheels 12, 14 and 16, 18 respectively and the safety blocks 10 and 11 being similarly mounted in front of the said rear wheels.

In connection with the rear wheels 24 of the trailer 4, safety blocking means 20 and 22 are mounted adjacent the faces or treads of the tires, being preferably independently suspended from the axle 26 of the rear wheels 24, a pair of blocks 20 being mounted to the rear thereof and a forward pair 22 being mounted in advance of the wheels 24.

The safety blocks are preferably of a tough durable metal, as steel, or an alloy thereof, such as vanadium steel, which has the desired durable qualities and sufficient compressive strength to resist the usual shocks to which they are subjected in ordinary use.

The safety blocks are preferably constructed in a plurality of parts comprising a main body portion 28 which is substantially triangular in cross-section, an inwardly curved portion 30, having a curvature substantially the same as that of the wheel against which it engages, and a toothed, road-gripping portion 32 removably connected to the body portion 28 by suitable fastening means, as bolts 34.

The curved portion 30 is preferably of spring steel having a sufficient tensile strength to withstand the pressure of the wheel against the surface thereof and may be fastened to the body portion 28 by any suitable fastening means as bolts 36.

The forward edge of the gripping portion 32 preferably has a serrated or saw-tooth edge 38 as indicated in Fig. 2 of the drawing, the edge being preferably of such character that it will become embedded in the ordinary asphalt or hard dirt road and will also engage the surface of a concrete pavement sufficiently so as to prevent sliding movement over it. It will be understood that the form of gripping surface or edge of the block may be varied as desired to suit any particular conditions or requirements and that I do not intend to limit the form to that shown, but the form and construction may be varied as will be apparent.

In connection with the tractor, as shown, or in connection with a motor vehicle, the stops or blocking devices are preferably suitably suspended from the axle casings, as 40 and 42, by means of collars 44 and 46 for the rear blocks 8 and 9 and by means of corresponding collars 48 and 50 for the corresponding forward block members 10 and 11.

The collars 44 and 46 for the rear block members, and the corresponding collars 48 and 50 for the forward block members are preferably made in two corresponding sections 52 and 54, as shown more particularly in Fig. 3 of the drawing, which sections may be suitably fastened together by means of bolts and nut members, as 56 and 58, for example. The collar members are preferably provided with a projection or arm 45 which is connected to a rod 60 by means of a pivot 62, the rod member 60 being connected to the cross-rod 64 at the other end.

The cross-rod 64 connects the block members 8 and 9, being passed through openings as 65 (Fig. 6) and being held in place preferably by means of nuts 67 and 69 at a point below the center of gravity, in the road-engaging position shown in Fig. 6 of the drawing.

The rear block members 8 and 9 are normally lifted into raised position by means of the cable 66 which is connected to the cross-rod 64 by means of a collar member 68 at the central portion of the cross-rod and passes over a pulley member 70, through a suitable casing member, if desired, to the winch 72, as shown more particularly in Fig. 5 of the drawing.

The winch is preferably supported below the floor-board 74 of the tractor, being mounted on a shaft member 80 which is supported in bracket members 76 and 78.

In order to raise the rear block members 8 and 9 into the inoperative position, in which they are suspended in a manner hereinafter to be described, the winch 72 is wound in a counterclockwise direction, referring to Fig. 7 of the drawing, by means of a ratchet 82 and pawl member 84, the pawl member 84 being pivoted on a lever member 86 which in turn is pivoted on a pivot 88 supported in a standard 90.

Connected to the pawl member 84 is a rod member 92 which passes through a lug member 94 on the lever member 86 and is pivotally connected to the pawl member by a pivot 96.

In order to maintain the pawl member 84 normally in raised position, a spring member 98 is supported on the rod above the lug 94 and presses against a lug member 100 on the rod 92, so that the rod is normally pressed upwardly, the end of the rod being above the upper end portion of the lever member 86 in its raised position.

By pressing the top of the lever 92 downwardly, by which the spring member 98 is compressed, the pawl member 84 engages the teeth on the ratchet 82 and by moving the lever member 86 and rod 92 back and forth about the pivot 88, the cable 66 passing under the winch 72 is wound onto the spool thereof.

The stop members 8 and 9 when raised by means of the cable member 66 are held in the raised position by means of hook members 102 and 104 which are suitably pivoted at the upper portions thereof so as to permit swinging movement rearwardly against the tension of spring members 106, 108 which normally retain the hook members in the forward position. The hook members are preferably connected by rod 103.

As the block members 8 and 9 are raised away from the faces of the wheels, the collar members 44 and 46 rotate through an angle slightly more than 90 degrees by which the rod 60 is brought upwardly into alignment with the arm 45 and the rod 64 engages the nose portion 110 of the hook members which serves as a cam, permitting the rod 64 to ride over the edge 112 of the hook members and engage the seats at the upper portion of the hook members by which the rod 64 and connected block members are held in the retracted position.

In order to release the block members 8 and 9, a cable 114, operatively connected to a release member 116, is provided, the cable being preferably connected thereto by means of a bell crank lever (not shown) which is so positioned and connected to the cable that as the release rod 116 is pressed, the cable 114 will be retracted a sufficient distance so as to bring the hook members 102 and 104 out of engagement with the rod 64, whereby the stop members 8 and 9 are dropped to the lowered position, shown more particularly in Fig. 3 of the drawing, in which the teeth members 38 engage the road surface.

It will be understood that in the operation of the rear block members 8 and 9, as in ascending a hill, for example, on which the motor is liable to stall, or which is particularly slippery, the block members are left in the lowered position until the top of the hill is reached, and although the teeth 38 drag on the road surface, there is no interference with the traction of the rear wheels, and in the event that the tractor or vehicle stops and starts to go backward, the teeth 38 engage the surface of the road and prevent the vehicle from moving backward. Moreover, as the blocks engage the road surface at the same time, there is no tendency for the truck to slide sideways, as occurs with the manual operation of placing blocks of wood under or to the rear of one wheel at a time.

In the operation of the block members 8 and 9, as described, the tires of the wheels engage the inner surface 30 and as the truck or vehicle starts to move backward, the resultant of the pressure exerted on the surface is substantially at the midpoint of the surface and in a direction to force the teeth 38 further into the road surface so as to prevent backward movement even on steep inclines.

The stop members 10 and 11, mounted in advance of the rear wheels 12, 14 and 16, 18 of the tractor are similar in every respect to the rear blocking members 8 and 9 and are mounted and operated in a manner similar to that described in connection with the rear blocking members.

Referring to Fig. 3 of the drawing, the forward blocking member 11 is shown in its raised position, in which the cross-rod 118 is supported by the hook members, as 120, in which position the rod members, as 122, and the extension 124 of the collar members 48 and 50 are in alignment, as indicated in full lines in the drawing.

In order to release the forward block members, a releasing means similar to that described in connection with that for operating the hook members 102 and 104 is employed, a cable 124 being connected preferably to the mid-portion of a cross-rod member similar to the cross-rod 103 (see Fig. 2) connecting the hook members 102 and 104, and to which the cable 114 is attached at its mid-portion.

When the hook members, as 120, are retracted by the cable 124 against the tension of the spring members, as 126 (Fig. 3), the block members 10 and 11 are rapidly lowered into the position indicated in dash lines at the right in Fig. 3, the blocking members, indicated at 11' engaging the front faces of the wheels and the rod 122 assuming the position indicated by 122'. A cable member 128 attached to the mid-portion of the cross-rod connecting the block members 10 and 11, which passes over a pulley 130, is simultaneously released from the winch 132, the pawl member 134 being in the raised position to permit release. The cable member 128 is suitably supported in rings or the like so that in the lowered position no more cable is let out than is necessary for the blocking members 10 and 11 to engage the road surface.

In raising the blocking members 10 and 11, a lever member 136 and a pawl-operating lever 138, similar to the lever 86 and rod member 92, above described in connection with the operation of the winch 72, is employed.

It will be understood that in the use of the invention as applied to the ordinary vehicle, only the forward and rear blocking members in connection with the rear wheels need be employed, but obviously as many units may be employed in connection with trucks, busses or other vehicles as may be necessary or desired.

In connection with the use of the invention as applied to a tractor-trailer combination, provisions must obviously be made for operating the blocking members connected to the rear wheels 24 of the trailer from the driver's seat in the tractor and means must be provided so that cable connections to the blocking members 20 and 22 will not be operated with relative turning movements of the trailer and tractor, as obviously would be the case if provisions were not made to have the cables pass through the point of coupling the trailer with the tractor.

The blocking members 20 and 22 are suspended from the axle 26 in substantially the same way as in connection with the axle casings 40 and 42, except that in connection with the trailer axle the collar members may be placed directly on the axle, whereas in connection with the axle housing 40 and 42, an inner ring member, as 138 and 140, must first be connected to the casing (Fig. 7), these ring members being provided with grooves which cooperate with corresponding projections on the inner surfaces of the collars so as to maintain the collar members in place while permitting rotary movement thereof. It will be understood, however, that the same mode of mounting the collar members and suspending the block member operating mechanism as above described in connection with the tractor may be employed, if desired. Means, as turn-buckles 143, may be provided for adjusting the lengths of the cables.

In order to prevent the hook operating cable and the cables connected to the winches from sagging, ring members, as indicated at 142 may be provided. It will be understood that other suitable supporting means may be employed, if desired, such as conduits or flexible casings as 144, 146. I preferably employ ring members as 142 through the straight portion of the path of the cables, as indicated in the drawing and employ casings 144 and 146 through the curved portion of the path, as shown.

In order to prevent shortening or lengthening of the cables with relative turning movements of the trailer and tractor, I preferably provide one or more looped casing portions 148, which conduct the operating cables from the point of coupling of the trailer with the tractor and force the cables to pass through the turning point and thus maintain constant cable lengths with turning movements of the vehicles, whereby the blocking members retain the desired position adjacent the rear wheels of the trailer.

The device of my invention has been described in connection with the tractor-trailer combination as obviously the invention is readily applied to the simpler forms of vehicles.

Although my invention has been described and illustrated as applied to the said tractor-trailer combination, it will be understood that it is equally applicable to other vehicles and it is to be understood that changes and modifications may be made as may be required for any particular installation of the invention to suit the particular needs.

It will be understood that the method of suspension and the lever mechanisms may be varied, as will be apparent to those skilled in the art, without departing from the spirit or scope of the invention as defined in the claims.

In applying the invention to trucks for use on construction jobs, in which a dumping body is employed, it will be desirable to suspend the block members by means of a mechanism supported sufficiently above the ground to give the desired clearance to prevent engagement with rocks, boulders and other objects which might be encountered in the ordinary use of the truck.

In connection with the use of the invention in connection with the tractor-trailer combination, means may be provided for operating two or more cables operating the rear pair of trailer blocking-members simultaneously with the rear blocking members of the tractor, as by winding the cables on the same winch, the operation of which is controlled by a single lever. The cable lengths may then be adjusted so as to have one set of blocking members operate in advance of the other set. For example, by lengthening the cable lengths connecting the hook members 148 by means of the turn-buckles 143, the rear blocking members 8, 9 of the tractor will be lowered into engagement with the road surface in advance of the blocking members 20, so that in going up a hill the blocking members 8, 9, will be operated first and thus prevent the possibility of buckling.

In connection with the operation of the forward blocking members, the turn buckles may be adjusted so that in backing up a hill the forward blocking members 22 of the trailer will engage with the road surface in advance of the blocking members 10, 11 so that the coupler between the trailer and the tractor will be maintained in tension in the event of stopping on the hill and thus avoid the possibility of buckling action.

The invention as above described in detail may obviously be used, if desired, in connection with automobiles, ordinary house-trailers, trucks and vehicles of all descriptions.

Having thus described the invention what is claimed as new is:

1. A mechanical wheel-blocking device for motor vehicles to arrest undesired movement thereof and to permit creeping action in the mounting of a hill where it is necessary to cut off the motor from time to time, which comprises a pair of wheel-blocking members having double curved surfaces to engage the corresponding wheel faces, buckling link means for suspending said members for operation adjacent the wheel faces from the axle-housing so as to permit swinging movement into and out of wheel-blocking position adjacent the wheel faces, a release mechanism for releasing the said members from retracted position into operating position so as to engage the road surface and to grip said surface in movement of the wheel in the direction of the said members without preventing wheel traction in a direction away from the said members whereby creeping action without slipping or movement in the undesired direction is obtained.

2. A mechanical wheel-blocking device for motor vehicles to arrest sliding or other movement of the vehicle in an undesired direction which comprises a pair of wheel-blocking members, each having a metal body portion, an inner double curved surface and a road-gripping portion on said body remote from said curved surface, means for suspending the said members from the axle housing, said suspending means being connected to the blocking members at a portion below the center of gravity in the road-engaging position and for operation adjacent a corresponding wheel pair so that in a movement of the wheels toward the said wheel-blocking members, the wheel faces will engage the said inner curved surface of each member, whereby the resultant of the pressure is at substantially the mid-point of the surface through the center of gravity of the member in a direction to force the said road-gripping portion into gripping engagement with the road surface, and means independent of said suspending means for retaining the said members in retracted position when not desired for use so as to take the load thereof directly from the wheel axles.

3. In a device of the kind described, a pair of wheel-blocking units adjacent one pair of wheels of a vehicle, a pair of wheel-blocking units adjacent another pair of wheels to the rear thereof, means for retaining the said wheel-blocking units in retracted position and releasing means for releasing the said units into engagement with the road surface adjacent the faces of the corresponding wheels of the vehicle and connecting means for releasing one pair of units slightly in advance of the release of the other units so as to operate first in connection with the more elevated pair of wheels and thus prevent turning movement of the vehicle.

4. A safety stop-mechanism for use in connection with motor vehicles to arrest undesired vehicle movement which comprises a block member having a road engaging toothed portion and a curved wheel engaging portion, means comprising a rotatable collar mounted on the axle-housing of the wheels and link elements pivotally connecting the collar with said block member for suspending said block member adjacent a vehicle wheel face to flexibly position the same in engagement with the road surface, means for releasing and lowering said member from retracted position to engage the road surface adjacent the wheel face, in which position the said wheel remains in contact with the road surface, means including a winch and a pawl and ratchet mechanism for withdrawing the said member out of contact with the road surface, and means including spring pressed hook members for retaining the said members in retracted position.

5. A safety stop-mechanism for use in connection with motor vehicles to prevent sliding movement forwardly or backwardly on a grade, which comprises a pair of safety blocks mounted forwardly of the rear wheels of the vehicle, means for suspending said blocks for operation from the axle housing of the said vehicle wheels, a pair of safety blocks mounted rearwardly of the said wheels, means for suspending said blocks for operation from the axle housing of the said vehicle wheels, means interconnecting each pair of safety blocks for simultaneously releasing the same into operative position in contact with the road surface, and lever means including a winch operatively connected to each pair of safety blocks for independently raising each pair of the said blocks out of engagement with the road surface.

6. A wheel-blocking device for motor vehicles to arrest retrogressive movement particularly during clutch engagement which comprises a blocking member having a double concave surface at the wheel-face engaging portion and a road gripping portion at the under face of the said member to prevent retrogressive sliding movement of the vehicle, pivoted link means for suspending the said blocking member from the axle housing, to determine the path of movement of the said member into and out of road-engaging position, means for supporting said member in inoperative position so as to support the load thereof away from the axle housing, and releasing means to permit movement of the blocking member into operative position in engagement with the road surface.

7. A mechanical wheel-blocking device for motor vehicles to arrest undesired movement thereof which comprises an axle, a housing about said axle, collar members on said housing, a wheel-blocking member, pivotally connected link elements for connecting the blocking member to one of the collar members, one of said link elements being connected to one of said collar members to permit swinging movement about the said housing, means connected to said link elements for raising the blocking member out of road engaging position, means for suspending the said blocking member in raised position and means for releasing the blocking member from suspended position.

CHESTER W. ACKERMAN.